United States Patent [19]

Wadlington

[11] Patent Number: 4,866,587
[45] Date of Patent: Sep. 12, 1989

[54] ELECTRONIC RINGING SIGNAL GENERATOR

[75] Inventor: James C. Wadlington, Mendham, N.J.

[73] Assignee: American Telephone and Telegraph Company AT&T Bell Laboratories, Murray Hill, N.J.

[21] Appl. No.: 288,328

[22] Filed: Dec. 22, 1988

[51] Int. Cl.$^4$ .......................................... H02M 3/335
[52] U.S. Cl. ........................................ 363/16; 363/21; 363/80; 363/97; 323/271; 379/418
[58] Field of Search ....................... 363/15, 16, 20, 21, 363/79, 80, 97; 323/208, 271; 379/64, 418

[56] References Cited

U.S. PATENT DOCUMENTS

| | | | |
|---|---|---|---|
| 3,986,097 | 10/1976 | Woods | 363/20 |
| 4,015,091 | 3/1977 | Rao et al. | 363/16 |
| 4,056,693 | 11/1977 | Bosik et al. | 363/16 |
| 4,189,764 | 2/1980 | Snyder | 363/21 |
| 4,257,087 | 3/1981 | uk | 363/16 |
| 4,395,675 | 7/1983 | Toumani | 323/271 |

Primary Examiner—Peter S. Wong
Attorney, Agent, or Firm—Alfred G. Steinmetz

[57] ABSTRACT

A switching power amplifier circuit has the functions of a power inverter and a switching amplifier embodied into one integral circuit. Two high frequency switching inverter circuits are connected back to back sharing the same inverter power transformer. One switching inverter circuit processes power from an input rail to an output capacitor while the other switching inverter circuit processes power from the output capacitor to the input rail. The output capacitor voltage is regulated with respect to a signal input in order to obtain the desired output signal waveform. A blocking capacitor in the output absorbs the DC component of the output capacitor voltage and allows a pure AC ringing signal to be applied to the load. In an application as a ringing generator circuit the signal input is supplied by a ringing signal oscillator circuit.

21 Claims, 2 Drawing Sheets

ELECTRONIC RINGING SIGNAL GENERATOR

FIELD OF THE INVENTION

This invention relates to switching power amplifiers and to electronic ringing signal generators and in particular to a ringing signal generator embodying a switching power amplifier.

BACKGROUND OF THE INVENTION

Telephone communication systems typically alert a customer to an incoming call by means of a ringing signal and provide other information through dial tones or busy signals. A suitable reliable AC ringing signal generator is required to supply a signal to drive a ringer or tone source to create the desired alerting or information signal. Such AC ringing signal generators have included rotary generators, magnetic generators and electronic oscillators.

A typical telephone ringer includes a series parallel magnetic circuit with an armature driving a bell clapper which is energized by a winding driven by the ringing signal generator. A certain minimum current is required in that winding to provide sufficient magnetomotive force to drive the bell clapper device. The waveform of this current is asymmetrical and due to the nonlinear magnetic circuit and tends to be highly peaked in one polarity direction. Due to reactive impedances in the ringing load, the current is out of phase with the voltage. Bidirectional power flow is required.

The ringing signal generator normally supplies a 20 Hz driving signal with some requirements for a 60 Hz driving signal for busy signals and dial tones. At these frequencies magnetic and rotary generators are very heavy and have considerable bulk. Electronic ringing signal generators are smaller but tend to have very low efficiency or be very expensive because of the need to power the nonlinear loads provided by the telephone network.

A typical magnetic ringing signal generator uses non linear magnetics and combines and subdivides frequencies to obtain suitable ringing signals. An electronic ringing signal generator normally comprises a ringing signal oscillator driving a ringing signal class B amplifier. These class B amplifiers have tended to be very power dissipative and must be overdesigned because of the asymmetrical nonlinear load that must be driven. Prior art switching power amplifiers have tended to be expensive complex circuits with a very high parts count and have a relatively low reliability.

SUMMARY OF THE INVENTION

The invention is embodied in a switching power amplifier utilized as an electronic ringing signal circuit which combines the functions of a power inverter and a switching amplifier into one integral circuit. Two high frequency switching inverter circuits are connected back to back sharing the same inverter power transformer. One switching inverter circuit processes power from an input rail to an output capacitor while the other switching inverter circuit processes power from the output capacitor to the input rail. The output capacitor voltage is regulated with respect to an ac reference signal in order to obtain the desired ringing signal. A blocking capacitor in the output absorbs the DC component of the output capacitor voltage and allows a pure ac ringing signal to be applied to the load.

In applications as a switching power amplifier another waveform source may be used in place of the reference AC signal to supply a signal to be amplified and be precisely reproduced.

DETAILED DESCRIPTION

Figure 1:
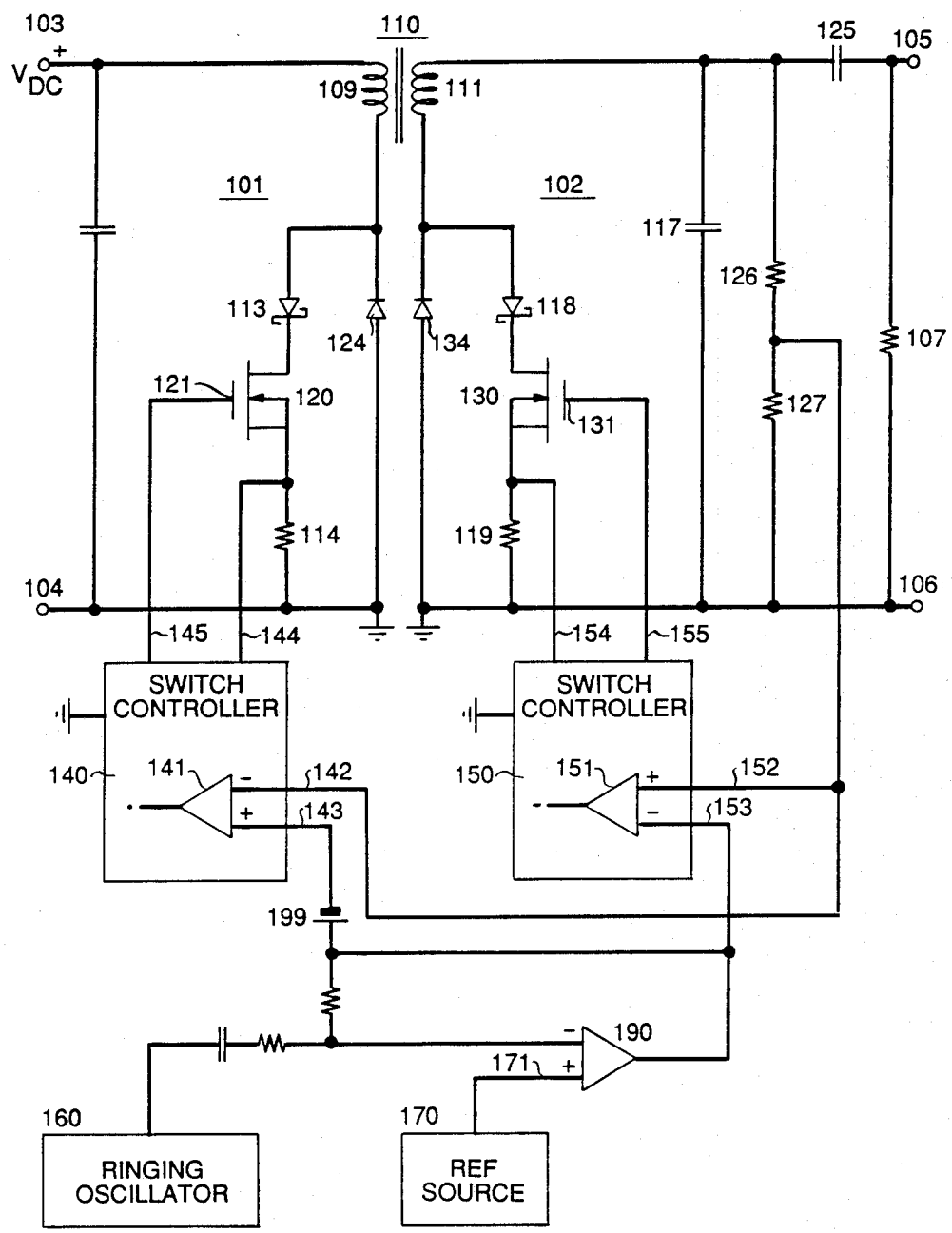
FIG. 1 is a schematic of an electronic ringing signal generator embodying the principles of the invention.

A schematic of a ringing signal generator application of a switching power amplifier embodying the principles of the invention is shown in FIG. 1. It includes a first switching inverter circuit 101 and a second switching inverter circuit 102; both units being connected to a common transformer 110. Terminals 103 and 104 accept a DC input voltage from a DC rail and terminals 105 and 106 supply a ringing signal output to a ringing load symbolically shown by resistor 107. A MOSFET power switching device 120 is connected in series with a first winding 109 of transformer 110 and is periodically switched to connect the DC voltage at terminals 103 and 104 to the first winding 109. A Schottky diode 113 and a current sensing resistor 114 are connected in series with the drain-source conducting path of the MOSFET power switching device 120. A diode 124 shunts the series connection of the MOSFET power switching device 120, the Schottky diode 113 and a current sensing resistor 114.

A second MOSFET power switching device 130 is connected in series with and connects a second winding 111 of transformer 110 to the capacitor 117. A Schottky diode 118 and a current sensing resistor 119 are connected in series with the drain-source conducting path of the MOSFET power switching device 130 and the three series connected components are connected in parallel with a diode 134. A DC block capacitor 125 is connected in series with terminal 105. A voltage sensing circuit including resistors 126 and 127 is connected in parallel with a series connection of the DC blocking capacitor 125 and the load resistor 107.

Figure 3:
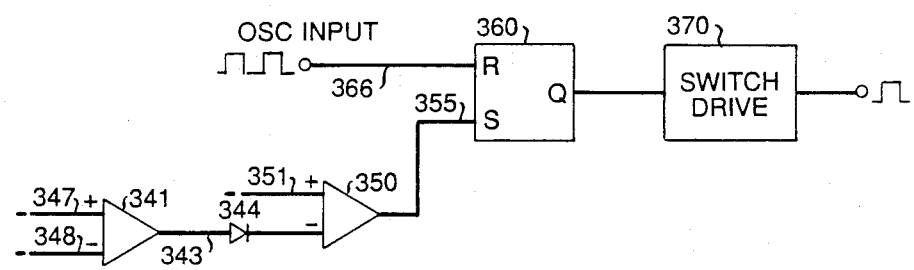
FIG. 3 is a schematic of a control circuit for controlling power switches in the electronic ringing signal generator of FIG. 1.

Drive to periodically switch the MOSFET power switching device 120 is supplied to its gate terminal 121 by the switching control circuit 140. A second switching control circuit 150 supplies a periodic drive to the gate terminal 131 of the MOSFET power switching device 130. Switching control circuits 140 and 150 are identical and are shown in FIG. 3 and discussed below. Each of these units 140 and 150 includes an error amplifier 141 and 151, respectively, each having a non-inverting and inverting input and adapted to accept input signals at each of the inputs. A voltage representative of the voltage across the series connection of the DC blocking capacitor 125 and the load resistor 107 is applied, via lead 142, to the negative terminal of error amplifier 141 and, via lead 152, to the non-inverting terminal of error amplifier 151.

A reference signal is derived from a DC reference voltage source 170 and from a reference waveform source embodied in this application as a ringing oscillator 160. The DC reference voltage is applied, via lead 171, to the positive input of an error amplifier 190. The output of the ringing oscillator 160 is a sinewave voltage and is applied, via lead 161, to the inverting input of the amplifier 190. The output of the amplifier 190 is connected, via lead 143, to the positive input of error amplifier 141 through an offset voltage source symbolically shown as battery 199 and, via lead 153, to the inverting input of error amplifier 151.

Each switching control circuit 140 and 150 is connected to the current sensing resistors 114 and 119, respectively, via leads 144 and 154. Drive to the gate terminals 121 and 131 of the MOSFET power switching devices 120 and 130 is provided, via leads 145 and 155, respectively. These switching control circuits 140 and 150 operate in a peak current control mode.

A schematic of a suitable switching control circuit for application to the circuit of FIG. 1 is shown in FIG. 3. This switching control circuit is commonly known as a current mode PWM controller and is available commercially as an IC. It includes an error amplifier 341 having a non-inverting input terminal 347 and an inverting input terminal 348. The output signal being controlled and a reference signal is applied to error amplifier 341 to determine a voltage error signal representative of a deviation of a voltage across the capacitor 117 (shown in FIG. 1) from a reference value. This error signal is applied, via lead 343 and diode 344, to a comparator 350. A current sense signal is applied to the other input 351 of comparator 350. The output of comparator 350, on lead 355, is applied to a flip flop 360 which is periodically reset by the output of an applied AC control signal (typically 100 KHz) applied to lead 366. The output of flip flop 360 is applied to a switch drive circuit 370 which is operative to control the conductivity state of a MOSFET power switching device.

In operation the switching control circuit of FIG. 3 sets a current threshold at which the MOSFET power switching device will be biased into non conduction in response to a deviation of the output voltage from a regulated value as determined by the reference voltage supplied by source 190. An output of error amplifier 341 representative of a deviation of the output voltage from the reference voltage sets the immediate current threshold value. This current threshold value is compared by comparator 350 with the voltage representing the actual current magnitude in the MOSFET power switching device and when the current threshold is attained the flip flop 360 is set to cause the switch drive circuit to bias the MOSFET power switching device nonconducting.

An understanding of the ringing signal generator of FIG. 1 may be readily attained by describing its operation. The first switching inverter circuit 101 processes input power applied to terminals 103 and 104 to the output capacitor 117. A DC voltage is applied to terminals 103 and 104 and is periodically applied to the first winding 109 of transformer 110 during the conducting intervals of the MOSFET power switching device 120. Conduction of the MOSFET power switching device 120 is controlled by the switching controller 140 which senses the voltage across the current sensing resistor 114, representing the current flow in the MOSFET power switching device 120 and biases it nonconducting when the voltage exceeds the threshold established in response to the error signal output of error amplifier 141. The error signal is representative of the deviation of the combined DC and AC voltage of the output capacitor 117 as divided by the voltage sensing voltage divider from the combined AC and DC reference voltage output of amplifier 190. Since the feedback voltage from the voltage sensing voltage divider is applied to the negative input of error amplifier 141 the first switching inverter circuit 101 is active when the output voltage, sensed by the voltage sensing voltage divider, is less than the reference voltage supplied by amplifier 190. The conduction interval of the MOSFET power switching device is controlled to increase the voltage across output capacitor 117. The polarity of the windings 109 and 111 is oriented so that energy is stored in the core of transformer 110 when the MOSFET power switching device 120 conducts and applied to the load when the MOSFET power switching device 120 is non conducting and the diode 134 is forward biased.

Switching inverter circuit 102 operates to process power from the output capacitor 117 to the input terminals 103 and 104. The voltage sensed by the voltage sensing circuit comprising resistors 126 and 127 is applied, via lead 152, to the positive input of error amplifier 151. The combined AC and DC reference voltage output of amplifier 190 is coupled to the negative input of error amplifier 151. MOSFET power switching device 130 is activated when the output voltage is greater than the reference voltage. It conducts when the MOSFET power switching device 120 is nonconducting. The conducting interval of the MOSFET power switching device 130 is terminated when the voltage across current sensing resistor 114 exceeds the threshold established by the output of error amplifier 151. Power is applied to the input terminals 103 and 104 via diode 124 which conducts energy stored in the transformer 110 when the MOSFET power switching device 130 is non conducting. A small offset voltage source 199 is inserted in series with lead 143 to insure that the switching inverter circuits 101 and 103 do not operate simultaneously to process power in their opposing directions. The switching inverter circuit 101 operates to process power only when power is processed from the input terminals 103 and 104 to the output terminals 105 and 106. Switching inverter circuit 102 operates to process power only when power is processed from the output terminals 105 and 106 to the input terminals 103 and 104.

By using the AC signal provided by the ringing oscillator 160 in combination with the DC voltage reference source 170 as a reference applied to the error amplifiers 141 and 151 a similar superimposed AC and DC signal appears across the output capacitor 117. This signal is applied to the ringing load 107 through the DC blocking capacitor 125 which blocks the DC bias voltage on the capacitor 117 and provides a pure AC ringing voltage signal to the load 107.

Figure 2:
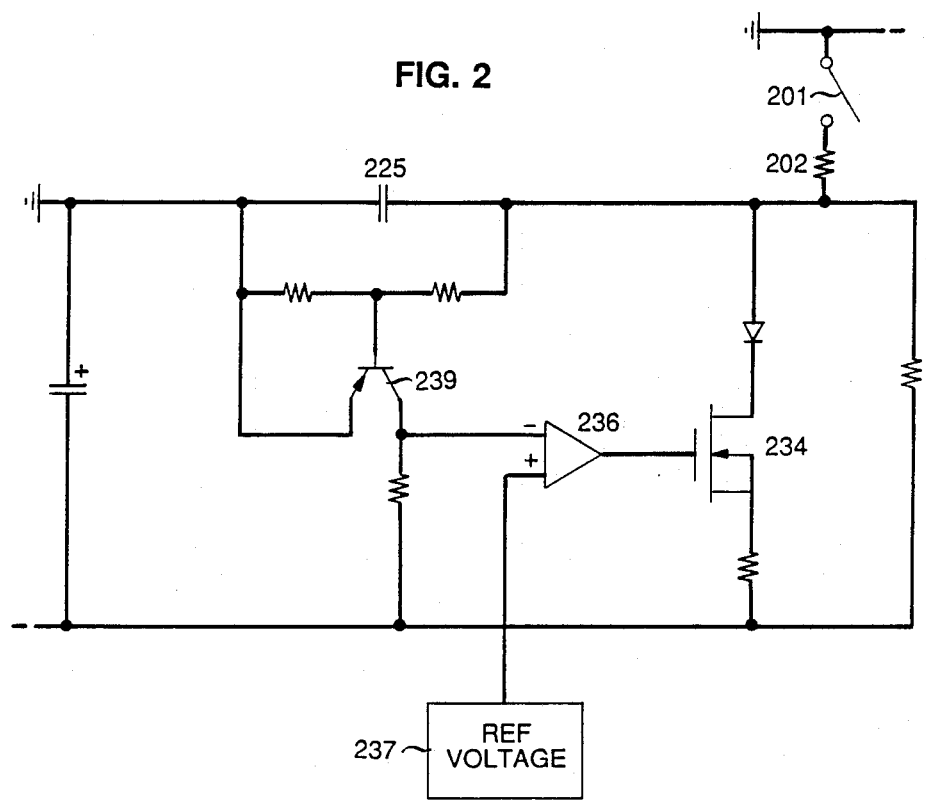
FIG. 2 is a schematic of circuitry added to the circuit of FIG. 1.

The output of the ringing signal generator includes a DC component due to the nature of its application. When the switch 201 (shown in FIG. 2) of the telephone set (not shown) is momentarily closed (i.e. when it goes off hook) the resistor 202 is coupled to ground and with repeated closures of switch 201 a DC charge is built up on the output blocking capacitor 225 which eventually presents a substantial DC voltage to the load. To prevent this occurrence a current sink circuit is shunted across the load. It includes a FET switch device 234. This FET switch device 234 is biased into conduction in response to an error amplifier 236 which compares the voltage across capacitor 225, as sensed by a voltage sensing circuit including a voltage divider and a transistor 239 biased by the voltage divider, with a reference voltage 237. The FET switch device 234 is biased into conduction to drain a charge from the blocking capacitor 225 equal to the amount injected into it by closures of switch 201.

The typical variation in DC voltage level across the output terminals 105 and 106 is difficult to measure and eliminate by direct control in response to such a measurement because of the large AC voltage component in the output voltage. The AC voltage component across the capacitor 225 is much smaller relative to the DC voltage level. Accordingly the DC voltage level across the capacitor 225 is regulated to permit a faster response in regulation. Since the objective is to apply a substantially pure AC voltage waveform to the load the the DC voltage across the capacitor 225 is regulated to a value equalling the DC voltage across the capacitor 117 (in FIG. 1) in order that the DC voltages cancel each other. Hence the value of the voltage of the reference source 170 (in FIG. 1) and the reference voltage 237 is identical and accordingly a single reference source may be used.

While a specific embodiment of the invention has been disclosed it is understood that many variations thereof may be constructed by those skilled in the art without departing from the spirit and scope of the invention. The reference waveform source, for example, may be a signal to be amplified. This signal may be periodic or aperiodic. Many applications for this switching power amplifier will be apparent to those skilled in the art.

I claim:

1. An electronic ringing signal generator comprising:
an input for accepting a DC voltage source;
an output for coupling to a ringing signal load;
a first switching circuit concerned to the input;
a second switching circuit connected to the output;
the first and second switching circuits coupled to a bidirectional power coupling circuit;
a reference signal input for accepting an AC reference signal;
a first control circuit for regulating power flow from the input to the output by controlling the first switching circuit to connect the input to the bidirectional power coupling circuit when an AC voltage at the output is less than the AC reference signal; and
a second control circuit for regulating power flow from the output to the input by controlling the second switching circuit to connect the output to the bidirectional power coupling circuit when an AC voltage at the output is greater than the AC reference signal.

2. An electronic ringing signal generator as claimed in claim 1 wherein:
the first control circuit includes a first error amplifier having a noninverting and an inverting input with the AC reference signal coupled to the noninverting input and a representation of the AC voltage at the output coupled to the inverting input; and
the second control circuit includes a second error amplifier having a non-inverting and an inverting input with the AC reference signal coupled to the inverting input and a representation of the AC voltage at the output coupled to the non-inverting input.

3. An electronic ringing signal generator as claimed in claim 2 wherein:
the bidirectional power coupling circuit comprises a transformer having a first and a second winding; and
the first switching circuit is connected to the first winding and the second switching circuit is connected to the second winding.

4. An electronic ringing signal generator as claimed in claim 3 and further including a DC blocking capacitor in series with the output and discharge circuitry for preventing a DC voltage buildup on the DC blocking capacitor.

5. An electronic ringing signal generator as claimed in claim 3 and further including a DC blocking capacitor in series with the output and a voltage sensing circuit connected to sense a voltage across the DC blocking capacitor, comparator circuitry to compare this voltage with a reference voltage and a discharge circuit including a switch responsive to the comparator circuitry.

6. An electronic ringing signal generator comprising:
a power switching amplifier, including;
an input and an output, the output including means for accepting a ringing signal load, a capacitor in parallel with the means for accepting and a DC block capacitor in series with the means for accepting,
a transformer having a first winding and a second winding,
a first power switch coupling the input to the first winding,
a first diode connected at least in parallel with the first power switch,
a first current sensing resistor in series with the first power switch,
a second power switch coupling the output to the second winding,
a second diode connected at least in parallel with the second power switch,
a second current sensing resistor in series with the second power switch; and
a feedback circuit including;
a voltage sensing circuit connected in parallel with a series connection of the DC blocking capacitor and the means for accepting a ringing signal load,
an AC reference source having an AC reference signal input and a DC reference signal input,
a first peak current control circuit, including; a first error amplifier having non-inverting and inverting input terminals, the non-inverting input terminal being coupled to an output of the AC reference source and the inverting input terminal being coupled to the voltage sensing circuit, a current sensing input coupled to the first current sensing resistor and a drive output coupled to a drive terminal of the first power switch; and
a second peak current control circuit, including; a second error amplifier having non-inverting and inverting input terminals, the inverting input terminal being coupled to an output of the AC reference source and the noninverting input terminal being coupled to the voltage sensing circuit, a current sensing input coupled to the second current sensing resistor and a drive output coupled to a drive terminal of the second power switch.

7. An electronic ringing signal generator as claimed in claim 6 and further including a circuit for measuring a DC voltage on the DC blocking capacitor and a discharge circuit for discharging the DC blocking capacitor.

8. A ringing signal generator, comprising:
an input for accepting a power signal;

an output for supplying a ringing signal;
a voltage sensing circuit for sensing a voltage at the output, and an AC reference signal input;
a first switching circuit operative for processing power from the input to the output, and including;
a first regulation circuit for regulating power flow from the input to the output and having an error amplifier positively responsive to the AC reference signal input and negatively responsive to the voltage sensing circuit; and
a second switching circuit operative for processing power from the output to the input and including;
a second regulation circuit for regulating power flow from the output to the input and having an error amplifier negatively responsive to the AC reference signal input and positively responsive to the voltage sensing circuit.

9. A ringing signal generator as claimed in claim 8, and further comprising:
a first current sensing circuit coupled for sensing a current in said first switching circuit;
a second current sensing circuit coupled for sensing a current in said second switching circuit; and
the first and second regulation circuits responsive to the first and second current sensing circuits, respectively, to limit peak current in the first and second switching circuits.

10. A ringing signal generator as claimed in claim 9, and further comprising:
a DC blocking capacitor in series with the output; and
a charge accumulation measurement circuit for monitoring a DC voltage on the DC blocking capacitor and a discharge circuit responsive to the charge accumulation circuit for discharging the DC blocking capacitor.

11. A ringing signal generator as claimed in claim 10, and further comprising:
a power transformer having a first and a second winding;
the first switching circuit connected to the first winding and the second switching circuit connected to the second winding; and
first and second reverse conduction paths in the first and second switching circuits for discharging energy stored in the transformer during non-conduction intervals of the first and second switching circuits.

12. A power switching amplifier comprising:
an input for accepting a DC voltage source;
an output for coupling to a power signal load;
a first switching circuit connected to the input;
a second switching circuit connected to the output;
the first and second switching circuits coupled to a bidirectional power coupling circuit;
a signal input for accepting a signal to be amplified;
a first control circuit for regulating power flow from the input to the output by controlling the first switching circuit to connect the input to the bidirectional power coupling circuit when a voltage at the output is less than an amplitude of the signal to be amplified; and
a second control circuit for regulating power flow from the output to the input by controlling the second switching circuit to connect the output to the bidirectional power coupling circuit when a voltage at the output is greater than an amplitude of the signal to be amplified.

13. A power switching amplifier as claimed in claim 12 wherein:
the first control circuit includes a first error amplifier having a non-inverting and an inverting input with the signal input coupled to the non-inverting input and a representation of the voltage at the output coupled to the inverting input; and
the second control circuit includes a second error amplifier having a non-inverting and in inverting input with the signal input coupled to the inverting input and a representation of the voltage at the output coupled to the non-inverting input.

14. A power switching amplifier as claimed in claim 13 wherein:
the bidirectional power coupling circuit comprises a transformer having a first and a second winding; and
the first switching circuit is connected to the first winding and the second switching circuit is connected to the second winding.

15. An power switching amplifier as claimed in claim 14 and further including a DC blocking capacitor in series with the output and discharge circuitry for preventing a DC voltage buildup on the DC blocking capacitor.

16. A power switching amplifier, comprising:
an input and an output, the output including means for accepting a load, a storage capacitor in parallel with the means for accepting and a DC blocking capacitor in series with the means for accepting,
a transformer having a first winding and a second winding,
a first power switch coupling the input to the first winding,
a first diode connected at least in parallel with the first power switch,
a first current sensing resistor in series with the first power switch,
a second power switch coupling the output to the second winding,
a second diode connected at least in parallel with the second power switch,
a second current sensing resistor in series with the second power switch; and
a feedback circuit including:
a voltage sensing circuit connected in parallel with a series connection of the DC blocking capacitor and the means for accepting a load,
a signal input for accepting a signal to be amplified,
a first peak current control circuit, including; a first error amplifier having non-inverting and inverting input terminals, the non-inverting input terminal being coupled to the signal input and the inverting input terminal being coupled to the voltage sensing circuit, a current sensing input coupled to the first current sensing resistor and a drive output coupled to a drive terminal of the first power switch; and
a second peak current control circuit, including; a second error amplifier having non-inverting and inverting input terminals, the inverting input terminal being coupled to the signal input and the non-inverting input terminal being coupled to the voltage sensing circuit, a current sensing input coupled to the second current sensing resistor and a drive output coupled to a drive terminal of the second power switch.

17. A power switching amplifier as claimed in claim 16 and further including a circuit for measuring a DC voltage on the DC blocking capacitor and a discharge circuit for discharging the DC blocking capacitor.

18. A power switching amplifier comprising:
an input for accepting a DC voltage source;
an output for coupling to a power signal load;
a first switching circuit connected to the input;
a second switching circuit connected to the output;
the first and second switching circuits coupled to a bidirectional power coupling circuit;
a signal input for accepting a signal to be amplified;
a control circuit for bidirectionally regulating power flow between the input and the output by controlling the first and second switching circuits to enable power flow from the input to the bidirectional power coupling circuit when a voltage at the output is less than an amplitude of the signal to be amplified; and to enable power flow from the output to the bidirectional power coupling circuit when a voltage at the output is greater than an amplitude of the signal to be amplified.

19. A power switching amplifier as claimed in claim 18 wherein:
the control circuit includes a first error amplifier having a non-inverting input and an inverting input with the signal input coupled to the non-inverting input; and further including a second error amplifier having a non-inverting input and an inverting input with the signal input coupled to the inverting input and a representation of the voltage at the output coupled to the non-inverting input.

20. A power switching amplifier as claimed in claim 19 wherein:
the bidirectional power coupling circuit comprises a transformer having a first and a second winding; and
the first switching circuit is connected to the first winding and the second switching circuit is connected to the second winding.

21. A power switching amplifier as claimed in claim 20 and further including a DC blocking capacitor in series with the output and discharge circuitry for preventing a DC voltage buildup on the DC blocking capacitor.

* * * * *